United States Patent [19]

Haber

[11] 4,236,440
[45] Dec. 2, 1980

[54] TRUSS STAPLE

[76] Inventor: Terry M. Haber, 2212 DuPont, Suite R, Irvine, Calif. 92715

[21] Appl. No.: 938,377

[22] Filed: Aug. 31, 1978

[51] Int. Cl.$^3$ .............................................. F16B 15/00
[52] U.S. Cl. .......................................... 85/49; 403/230
[58] Field of Search ................. 85/49, 13, 17; 52/700; 403/405, 230-231; 24/87 C, 87 R; 206/343-346

[56] References Cited

U.S. PATENT DOCUMENTS

| | | | |
|---|---|---|---|
| 210,482 | 12/1878 | Andren | 85/49 X |
| 1,125,477 | 1/1915 | Conn | 85/17 X |
| 2,113,292 | 4/1938 | Cook | 85/49 X |
| 2,117,308 | 5/1938 | Frey | 85/13 |
| 2,811,073 | 10/1957 | Klopstock | 85/49 |
| 3,368,445 | 2/1968 | Trzesniewski | 85/49 |
| 3,527,477 | 9/1970 | Langwell | 85/49 X |

FOREIGN PATENT DOCUMENTS

| | | | |
|---|---|---|---|
| 813449 | 9/1951 | Fed. Rep. of Germany | 85/17 |
| 13996 | 7/1905 | United Kingdom | 24/87 C |

*Primary Examiner*—Ramon S. Britts
*Attorney, Agent, or Firm*—Ralph B. Pastoriza

[57] ABSTRACT

The staple is in the form of an integral metal wire bent into a V-shape, the vertex of the V in turn being bent at 90° to form a first punching element. The diverging ends of the arms of the V-shape in turn are bent downwardly 90° to form second and third punching elements. The staple can be used to fasten two members with one of the punching elements being received in one member and the remaining two punching elements being received in the other, the general V-shape of the staple providing stability at the stapled joints of the members.

2 Claims, 5 Drawing Figures

TRUSS STAPLE

BACKGROUND OF THE INVENTION

Conventional staples comprise a single integral wire with opposite ends bent downwardly at 90° to provide two punching elements. The wire is generally C-shaped and when used to fasten two work members together, the C-shape straddles the joint.

Because only one punching element of the conventional staple is received on each side of the joint of two members to be fastened, the members are really not secured in a stable manner inasmuch as one can move or pivot about the staple point embedded therein relative to the other member.

It would be desirable to design a staple which would avoid the above-described instability.

SUMMARY OF THE INVENTION

The present invention contemplates an improved staple construction providing stability between members fastened together by the staple.

Briefly, the staple of this invention functions as a truss and is provided in a general V-shape when viewed in plan. Three punching elements are provided, one at the vertex and the other two at the terminal ends of the arms of the V-shape.

In the preferred embodiment, the truss staple is made up of a single integral wire.

With the foregoing construction, at least one of two members to be secured will have two punching elements received on one side of the joint so that in conjunction with the third punching element on the other side of the joint, stability is provided against lateral or pivoting movements of the secured members relative to each other.

BRIEF DESCRIPTION OF THE DRAWINGS

A better understanding of this invention as well as further features and advantages thereof will be had by referring to the accompanying drawings in which.

DETAILED DESCRIPTION OF THE PREFERRED EMBODIMENT

Figure 1:
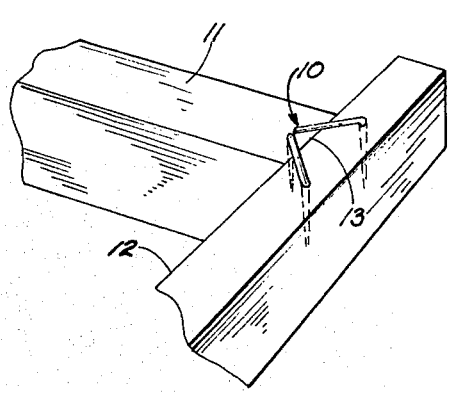
FIG. 1 discloses first and second work members defining a joint secured together by the staple of this invention.

Referring first to FIG. 1, the truss staple of this invention is designated generally by the numeral 10 and is shown in position fastening first and second work members 11 and 12 together. In the particular example illustrated, the work member 11 might constitute a piece of wood intersecting at right angles a second piece of wood 12, the truss staple straddling the joint 13 of these two members.

Figure 2:
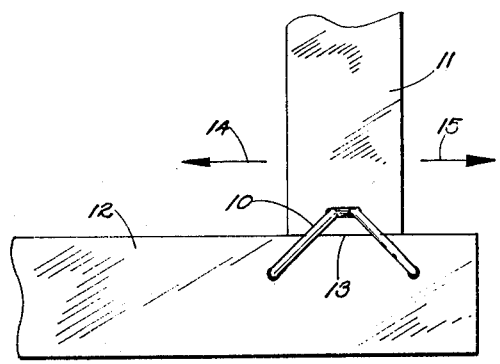
FIG. 2 is a top plan view of the work members and staple of FIG. 1.

The foregoing is more clearly shown in the plan view of FIG. 2 wherein it will be noted that the truss staple 10 is generally V-shaped when viewed in plan. As will become clearer as the description proceeds, there are provided three puncturing elements on the staple 10, one being at the vertex and penetrating the work member 11 and the remaining two at the ends of the diverging arms of the V penetrating the work member 12, all punching elements being generally parallel to each other and normal to the plane of the V-shape.

One punching element is thus on one side of the joint 13 and the remaining two on the other side of the joint 13. With this arrangement, the work piece 11 is stabilized with respect to lateral or possible pivoting movement relative to the joint 13 and other member 12 as indicated by the arrows 14 and 15.

Figure 3:
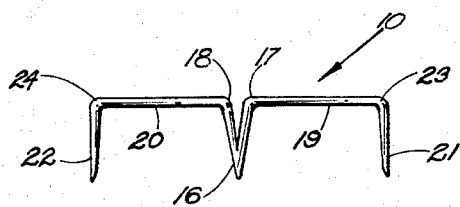
FIG. 3 is a rear elevational view of the truss staple itself of this invention.

Referring now to the rear elevational view of the truss staple 10 itself as shown in FIG. 3, the preferred embodiment constitutes an integral metal wire formed into the already described V-shape with the vertex 16 of this V shape bent downwardly 90° as at 17 and 18 to define a front punching element. The diverging arms of the V shown at 19 and 20 terminate in rear punching elements 21 and 22 respectively formed as by bending the end portions at 23 and 24 90° so as to be generally parallel to each other and to the front punching element.

Figure 4:
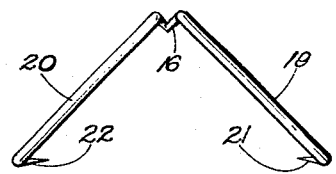
FIG. 4 is a top plan view of the truss staple of this invention.

Referring to the top plan view of FIG. 4, it will be seen that the front punching element formed by the vertex 16 and the rear punching elements formed by the downturned ends 21 and 22 define end points which lie on the vertices of a triangle. This triangle is always preferably a triangle having no angles greater than 90° so as to include any acute triangle as well as an isosceles right triangle.

Referring once again to FIG. 2, it will be appreciated that because of the triangular disposition of the three punching elements, the resulting truss type construction will properly secure the members 11 and 12 and inhibit the indicated possible wobbling movement depicted by the arrows 14 and 15.

Figure 5:
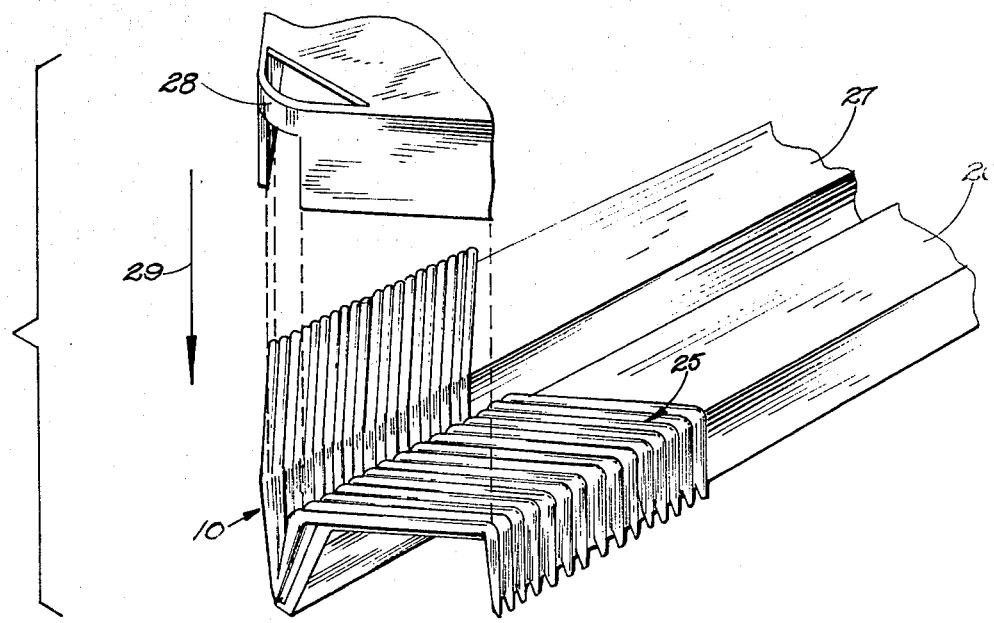
FIG. 5 is an exploded perspective view illustrating a plurality of additional truss staples and associated components of a staple machine.

FIG. 5 illustrates a plurality of additional truss staples 25 with their V-shapes generally nested together for support on appropriate guides 26 and 27 of a staple machine. In this respect, a V-shaped striking head end 28 would be provided in the staple machine so that when the head moves downwardly in the direction of the arrow 29, it will strike the full upwardly facing surface area of the general V-shape of the staple, thereby driving all three punching elements simultaneously.

The nested plurality of staples can be secured together in their nested relationship as illustrated by a light glue as is done with conventional staples. Only minor modifications are necessary in an appropriate staple machine for driving the staples of this invention.

From all of the foregoing, it will be evident that the present invention has provided an improved staple construction overcoming problems heretofore encountered in the fastening of work member joints with conventional staples.

I claim:

1. A truss staple comprising an integral metal wire formed into a general V-shape with the vertex of the V bent downwardly 90° to define a front punching element and the diverging arms of the V terminating in downturned ends defining spaced rear punching elements generally parallel to each other and to said front punching element, the end points of said front punching element and rear punching elements defining the vertices of a right isosceles triangle whereby first and second work members intersecting at right angles to define a joint can be fastened with said staple by forcing one of said punching elements into one member on one side of the joint and the remaining two punching elements in the other of said members on the other side of said joint so that said members are stabilized against lateral and swinging movements relative to each other at said joint.

2. A staple according to claim 1, in which a plurality of identically formed additional staples are provided with their V-shapes nested together for reception in a staple machine having a V-shaped striking head end.

* * * * *